United States Patent [19]

Tisbo et al.

[11] Patent Number: 5,787,588

[45] Date of Patent: Aug. 4, 1998

[54] ICE CHIPPER

[75] Inventors: Thomas A. Tisbo, Barrington Hills; Stephen P. Whitehead, Elgin, both of Ill.

[73] Assignee: Suncast Corporation, Batavia, Ill.

[21] Appl. No.: 455,907

[22] Filed: May 31, 1995

[51] Int. Cl.[6] .................................................. E01H 5/02
[52] U.S. Cl. ........................... 30/164.5; 30/315; 294/54.5; 294/57
[58] Field of Search .......................... 294/49, 50, 51, 294/54.5, 56–60; 15/236.01, 236.02; 16/110 R, 111 R, 116 R; 30/164.5–164.8, 169, 171, 315, 329, 334, 337, 340, 344; 37/241, 265, 266, 285; 56/400.01, 400.04–400.07, 400.17; 172/13, 18, 371, 372, 380

[56] References Cited

U.S. PATENT DOCUMENTS

| | | | |
|---|---|---|---|
| D. 214,662 | 7/1969 | Portz | D8/10 |
| D. 257,210 | 10/1980 | Bonnes | 294/54.5 X |
| D. 267,468 | 1/1983 | Simms | 294/54.5 X |
| D. 269,490 | 6/1983 | Germain | D8/1 |
| D. 284,733 | 7/1986 | Hozumi | D8/10 |
| D. 291,863 | 9/1987 | Kolonia | D8/10 |
| D. 296,410 | 6/1988 | Abbott | 294/54.5 X |
| D. 306,962 | 4/1990 | Schuele | D8/13 |
| D. 328,553 | 8/1992 | Norton et al. | 294/54.5 X |
| D. 331,652 | 12/1992 | Wu | D34/27 |
| D. 350,166 | 8/1994 | Kino | D21/120 |
| D. 360,564 | 7/1995 | Tisbo et al. | D8/10 |
| D. 363,653 | 10/1995 | Tisbo et al. | 294/49 X |
| 366,099 | 7/1887 | Hinchman | 294/56 |
| D. 384,559 | 10/1997 | Tisbo et al. | D8/10 |
| D. 384,866 | 10/1997 | Tisbo et al. | D8/10 |
| D. 385,160 | 10/1997 | Tisbo et al. | D8/10 |
| 678,373 | 7/1901 | Blaser | 294/60 X |
| 864,338 | 8/1907 | Schertzer | 30/315 |
| 930,660 | 8/1909 | Gifford | 294/54.5 |
| 964,453 | 7/1910 | Robarge | 294/54.5 |
| 967,270 | 8/1910 | Tiedt | 294/54.5 X |
| 1,042,352 | 10/1912 | Kohler | 294/54.5 |
| 1,260,276 | 3/1918 | Miller | 294/54.5 |
| 1,435,061 | 11/1922 | Halsey | 30/164.5 X |
| 1,839,285 | 1/1932 | Winkie | 294/54.5 |
| 1,931,349 | 10/1933 | Habig | 294/60 X |
| 3,119,596 | 1/1964 | Pratt | 254/131.1 |
| 3,177,026 | 4/1965 | Cowan | 294/54.5 |
| 3,680,641 | 8/1972 | Hein | 294/49 X |
| 4,149,744 | 4/1979 | Bonnes | 294/54.5 |
| 4,247,141 | 1/1981 | Grint | 294/49 |
| 4,280,727 | 7/1981 | Germain | 294/54 |
| 4,538,847 | 9/1985 | Lapshansky | 294/51 |
| 4,655,494 | 4/1987 | Eads et al. | 294/49 |
| 4,690,447 | 9/1987 | Adams | 294/57 |
| 4,848,073 | 7/1989 | Germain et al. | 56/400.17 |
| 4,878,704 | 11/1989 | Jacanin, Jr. | 294/54.5 |
| 4,991,324 | 2/1991 | Fine et al. | 294/54.5 X |
| 4,993,768 | 2/1991 | Ewen | 294/51 |
| 5,228,734 | 7/1993 | Pollastro | 294/54.5 |
| 5,419,600 | 5/1995 | Tisbo et al. | 294/54.5 |
| 5,435,063 | 7/1995 | Russo | 30/164.5 |

FOREIGN PATENT DOCUMENTS

| | | | |
|---|---|---|---|
| 234243 | 12/1959 | Australia | 294/57 |
| 2285163 | 4/1976 | France . | |
| 641210 | 8/1933 | Germany . | |
| 687817 | 1/1940 | Germany . | |
| 369590 | 3/1939 | Italy . | |
| 1009947 | 11/1965 | United Kingdom | 294/58 |
| 1173714 | 12/1969 | United Kingdom | 294/57 |
| 1424565 | 2/1976 | United Kingdom | 294/57 |
| 2063142 | 6/1981 | United Kingdom . | |

*Primary Examiner*—Johnny D. Cherry
*Attorney, Agent, or Firm*—Thomas W. Tolpin

[57] ABSTRACT

An improved ice chipper having a plastic blade holder with outwardly propagating reinforced ribs holds a flex resistant blade of minimal thickness. A shaft of the ice chipper can be constructed of a low cost steel pipe covered with a polyethylene sleeve with knurled grip surfaces. The sleeve conforms to the pipe diameter upon application of heat during manufacture. A one-piece handle is attached to the free end of the shaft.

21 Claims, 12 Drawing Sheets

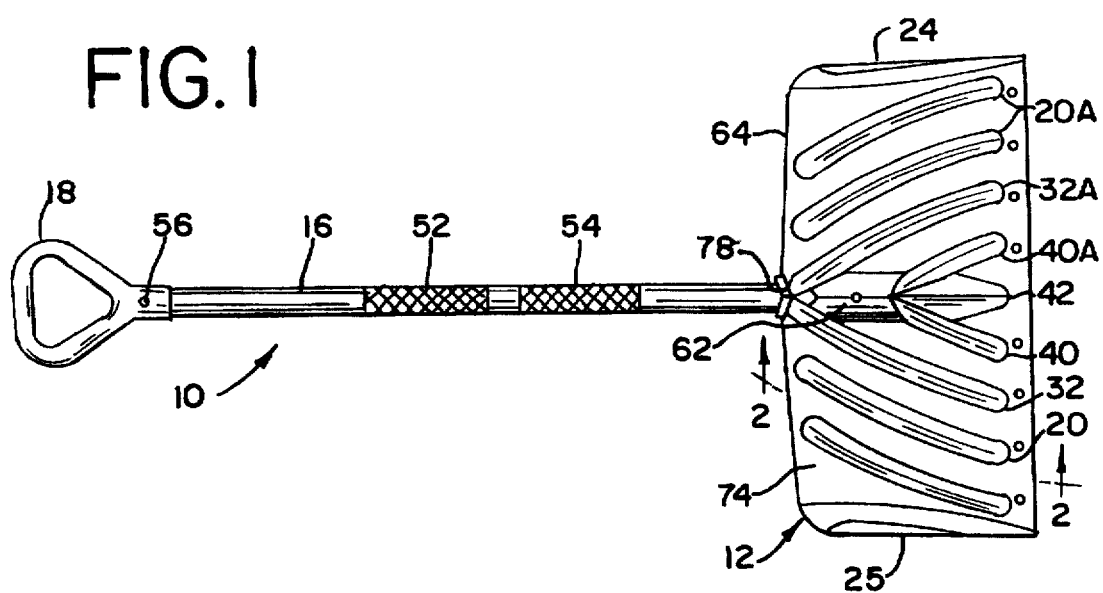
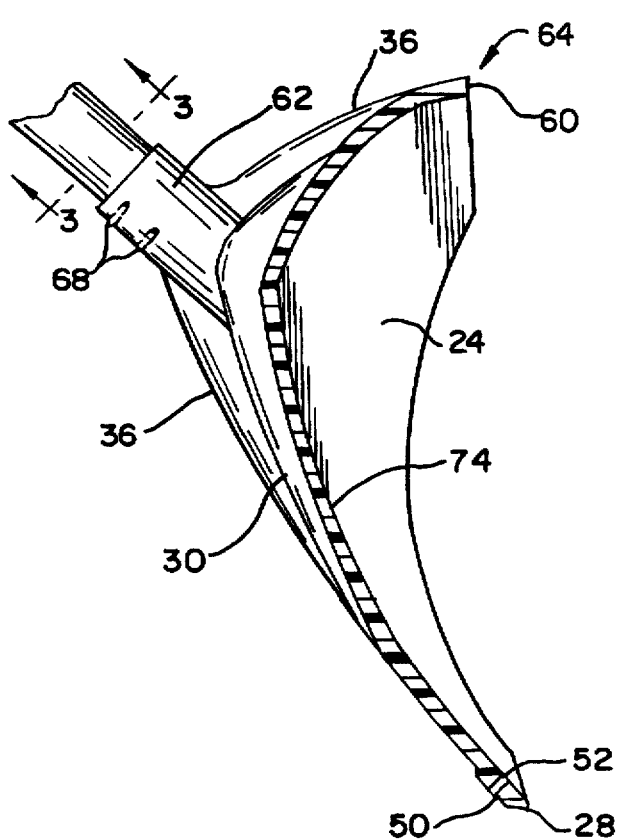
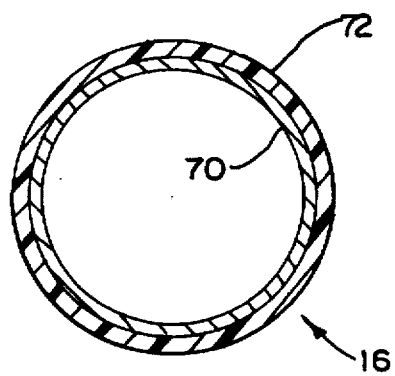
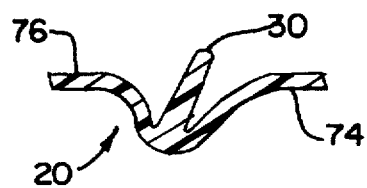

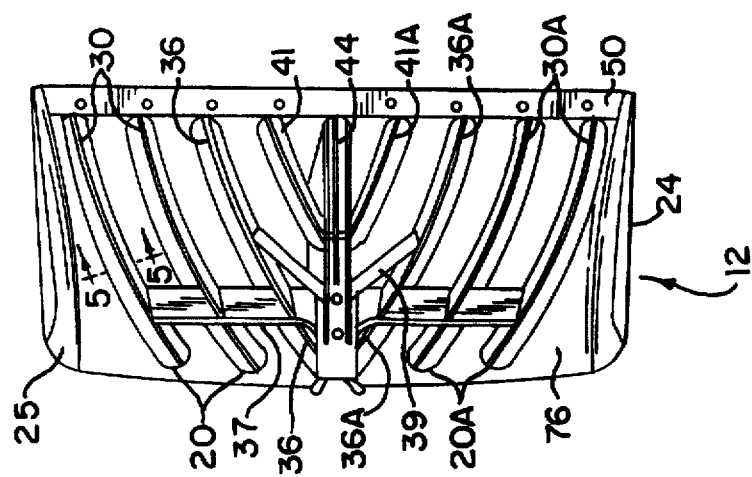
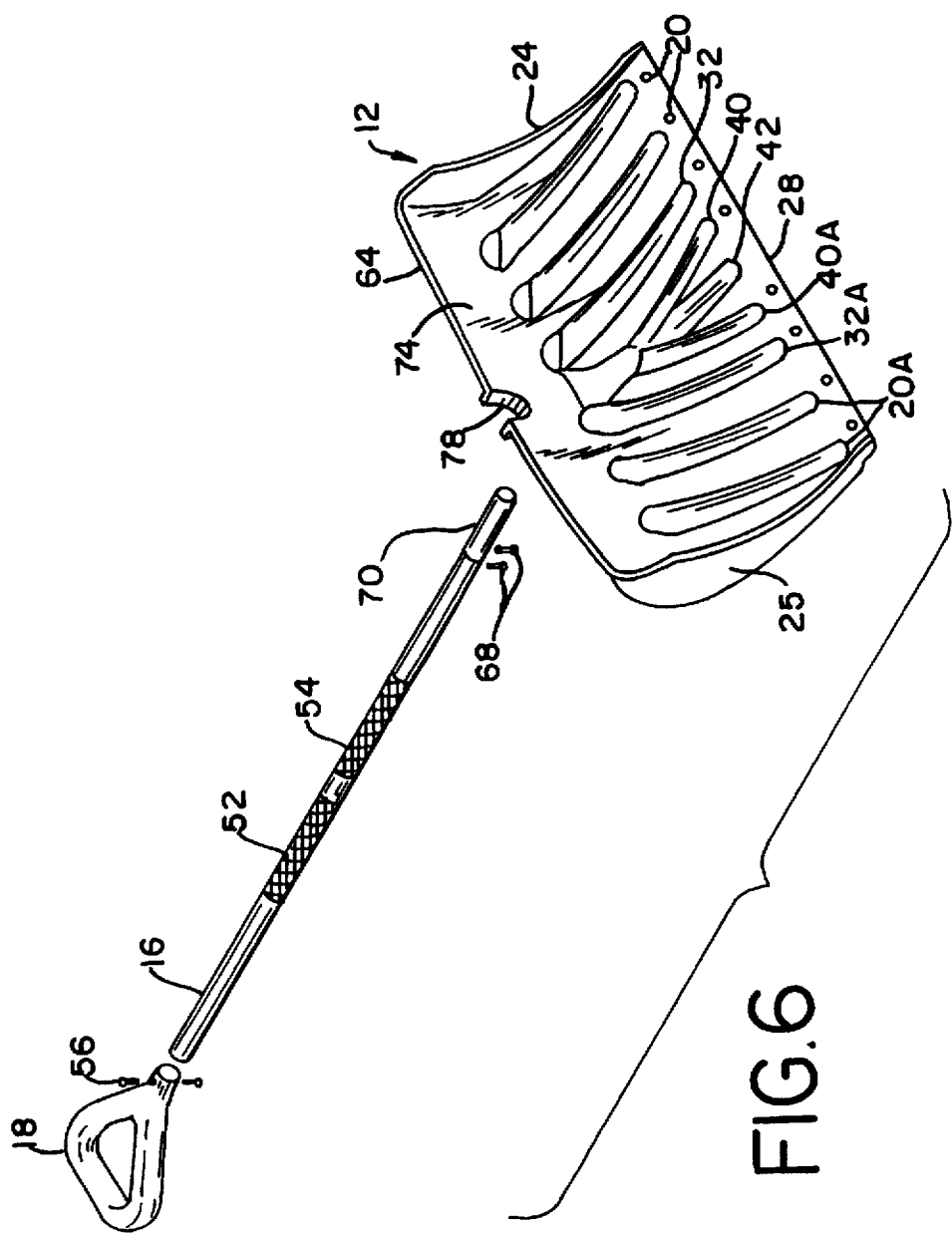

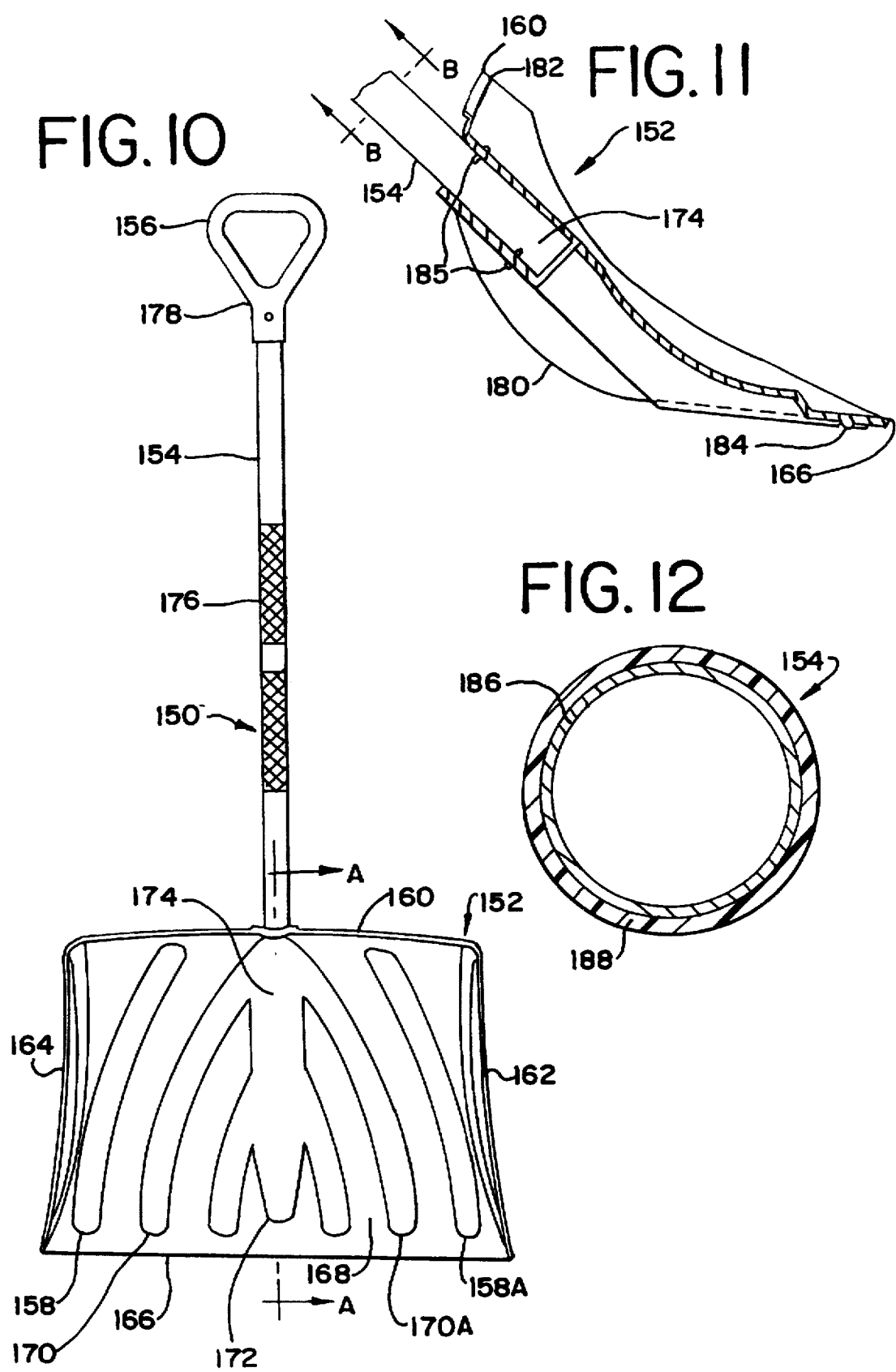

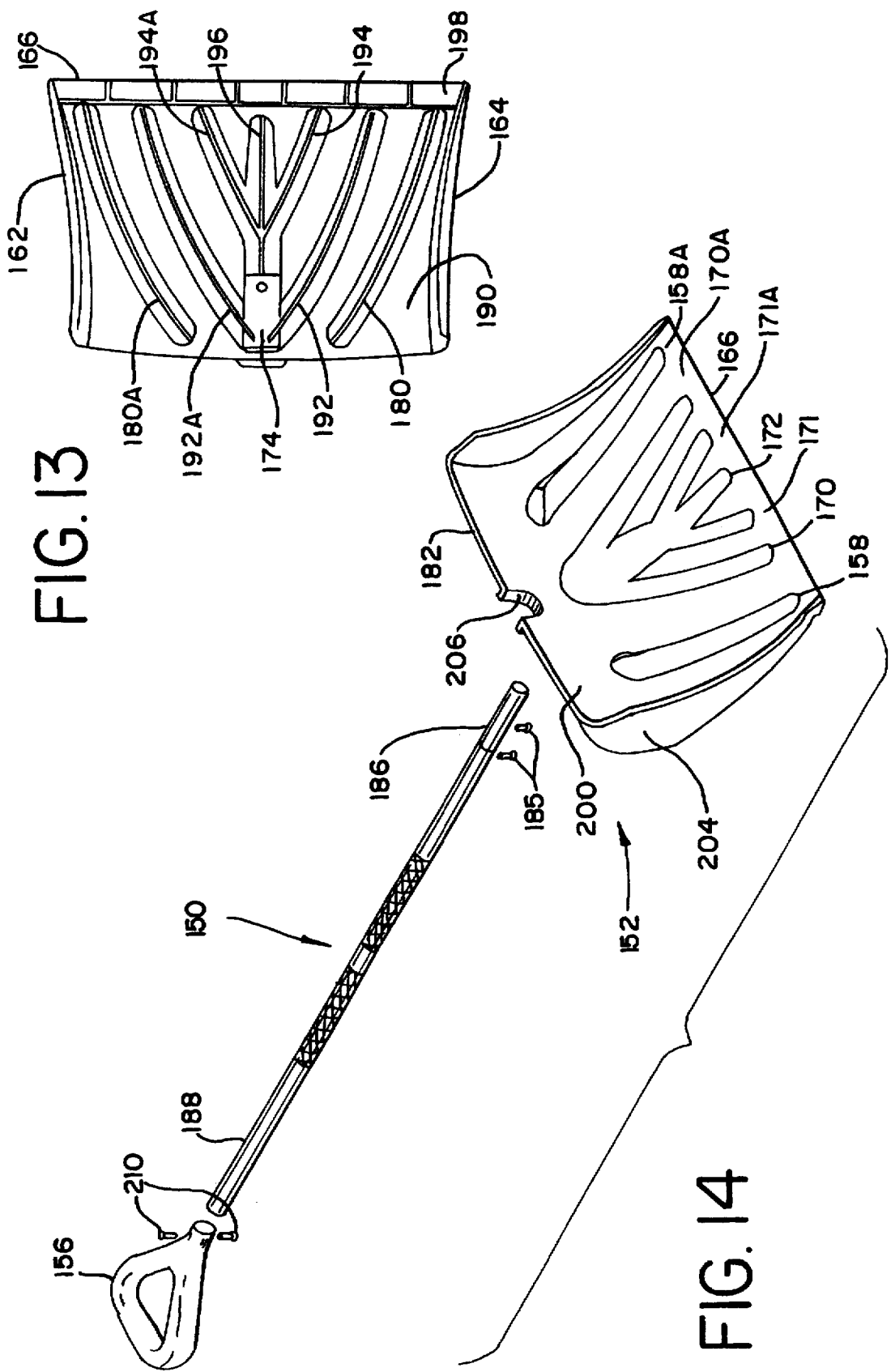

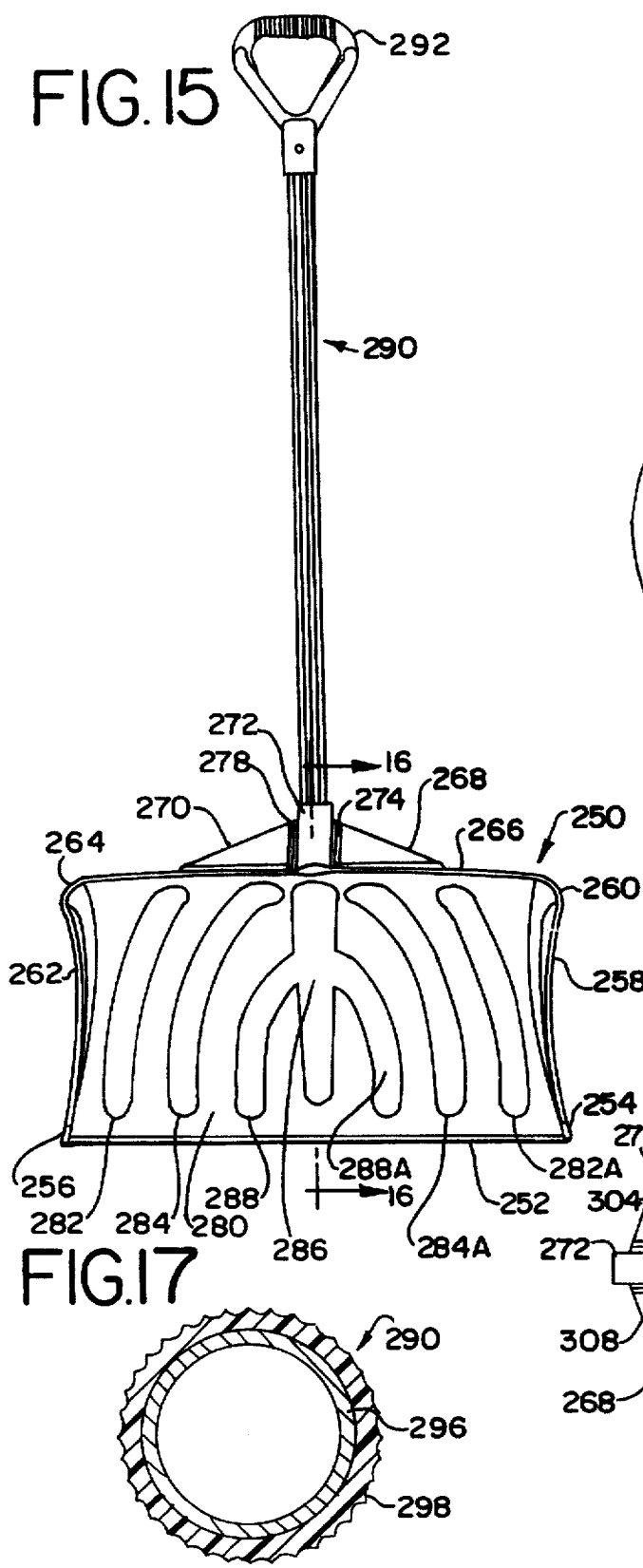
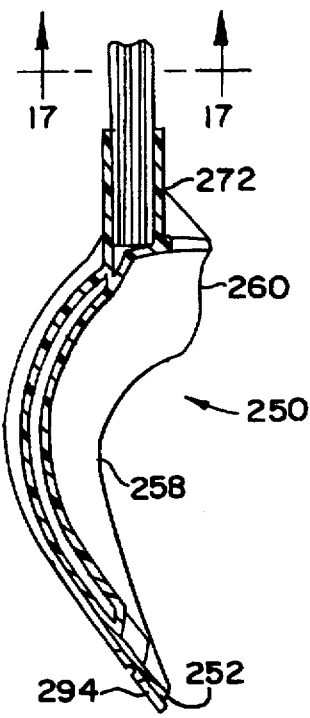
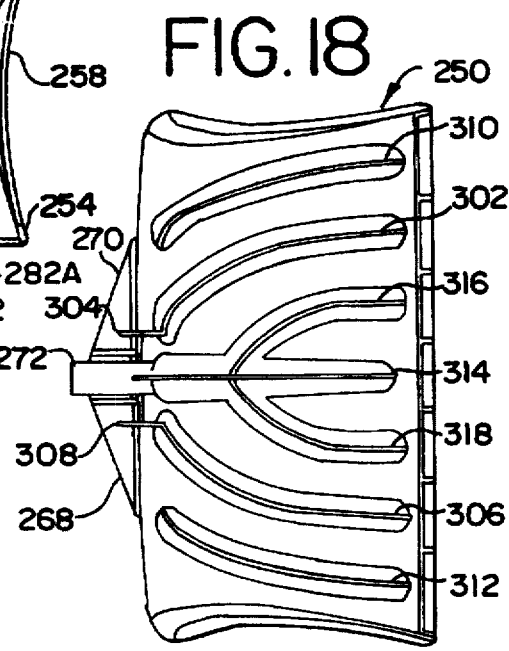

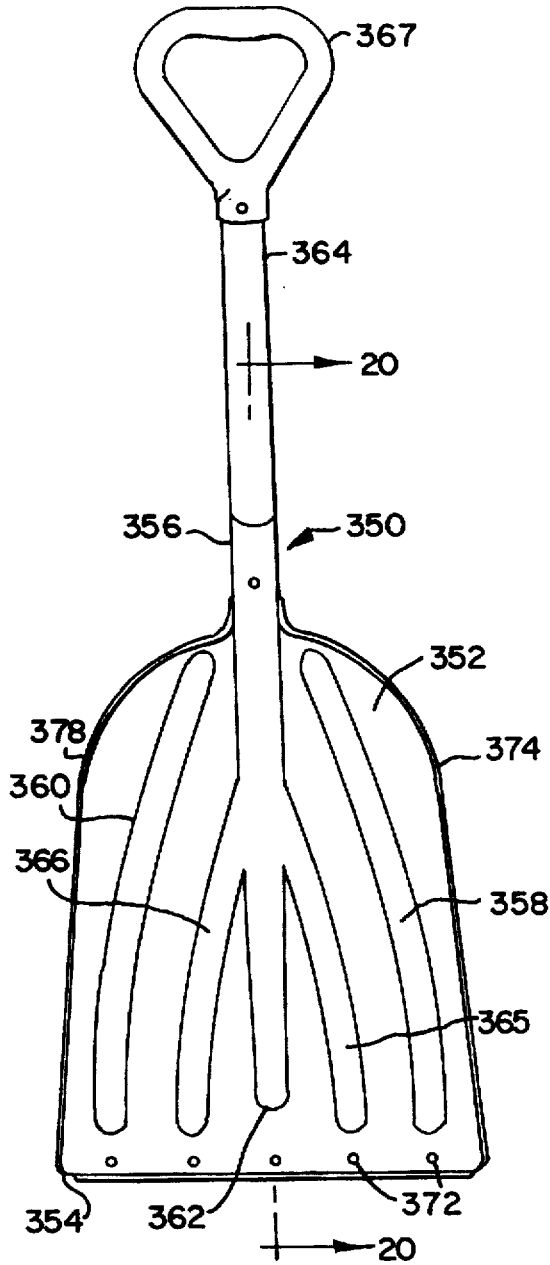
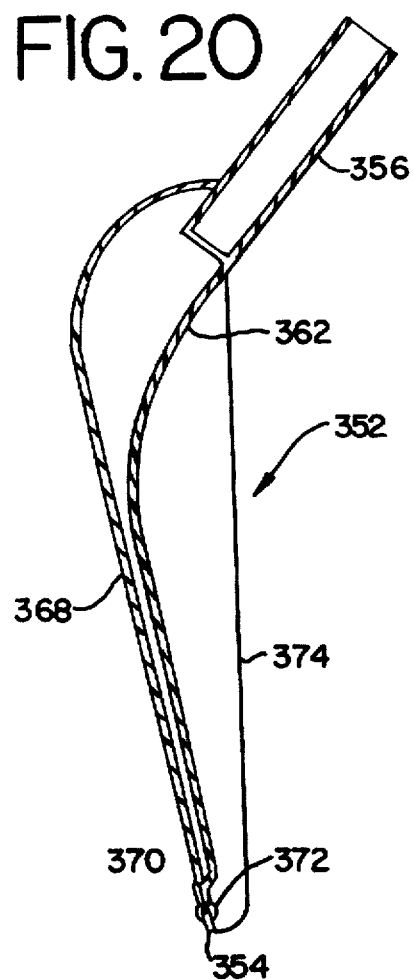
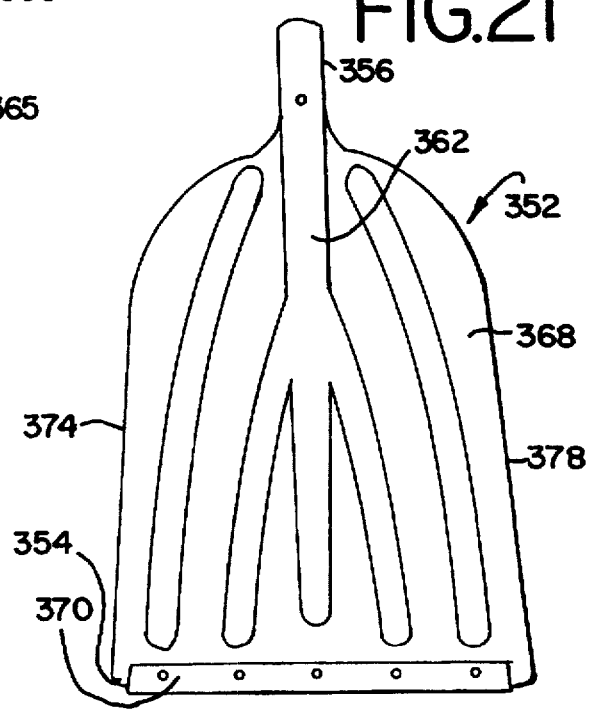

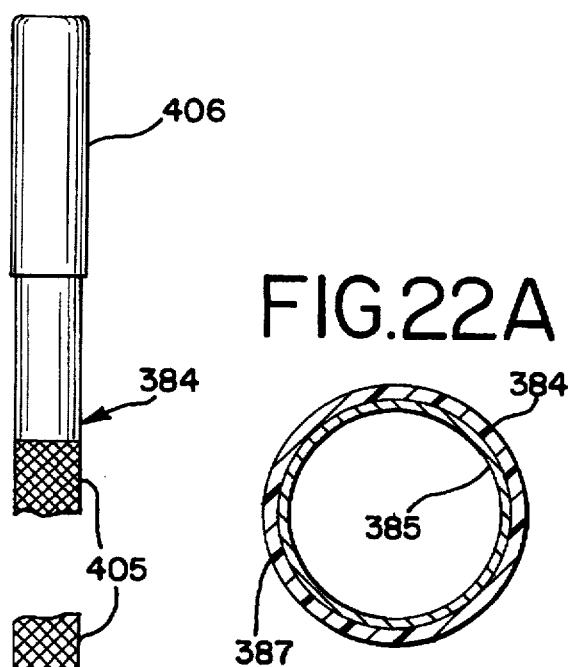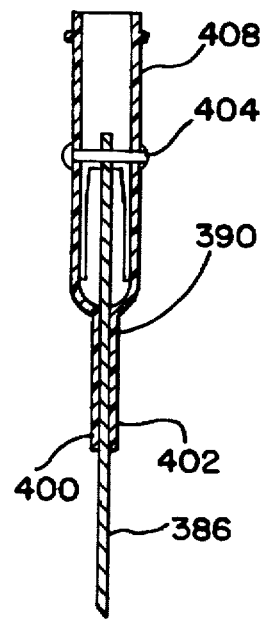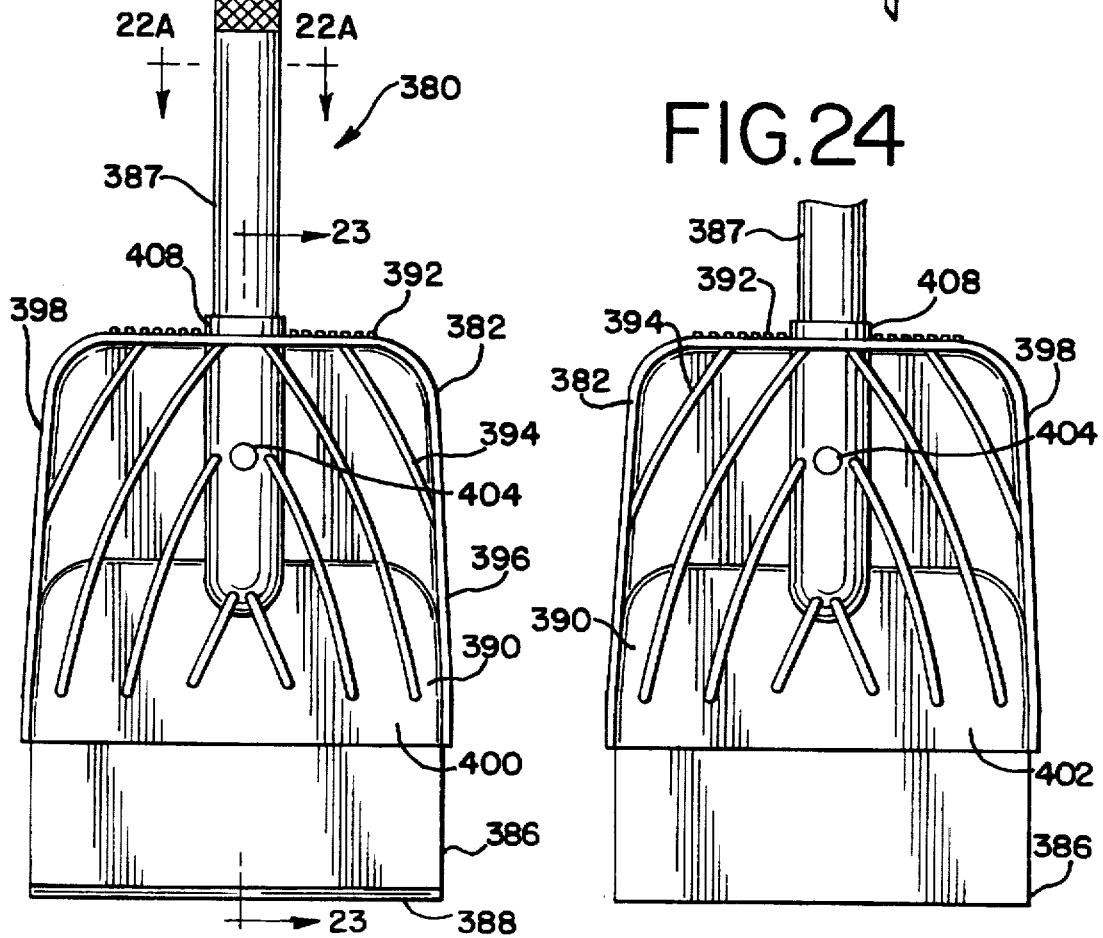

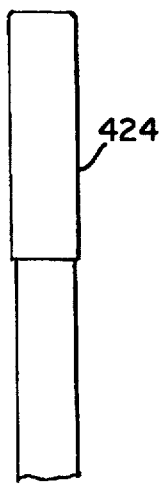
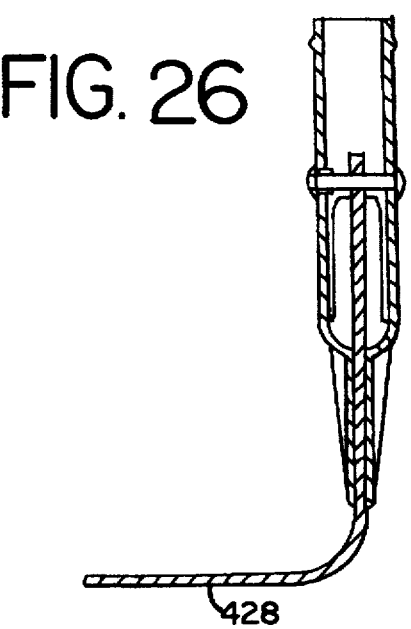
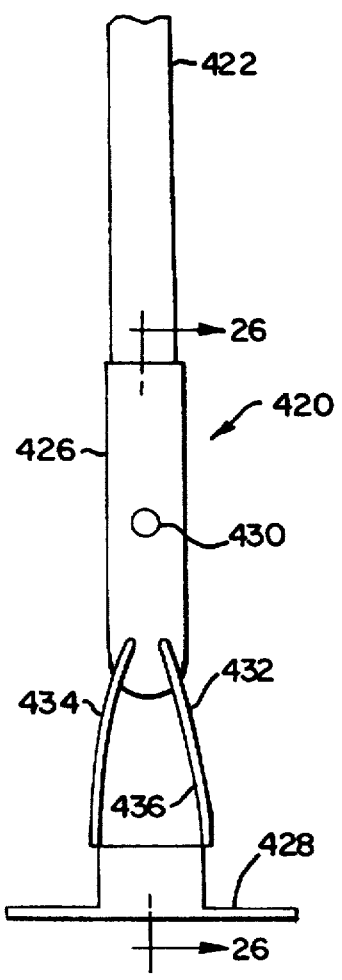
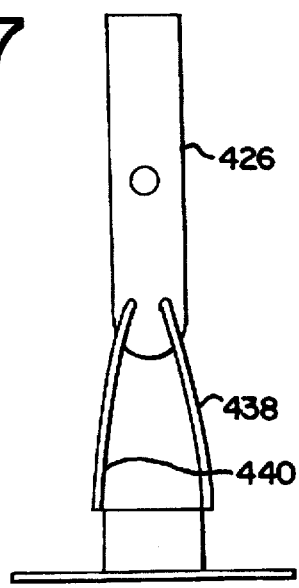
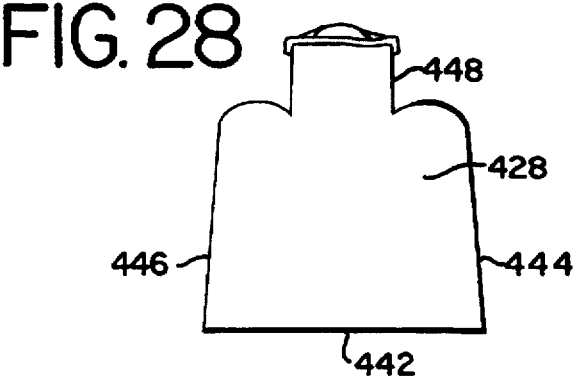

FIG. 29
FIG. 30
FIG. 31
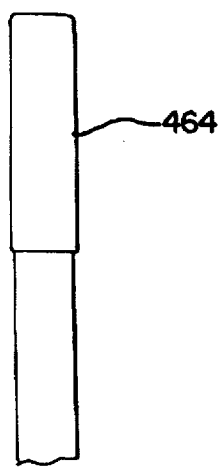
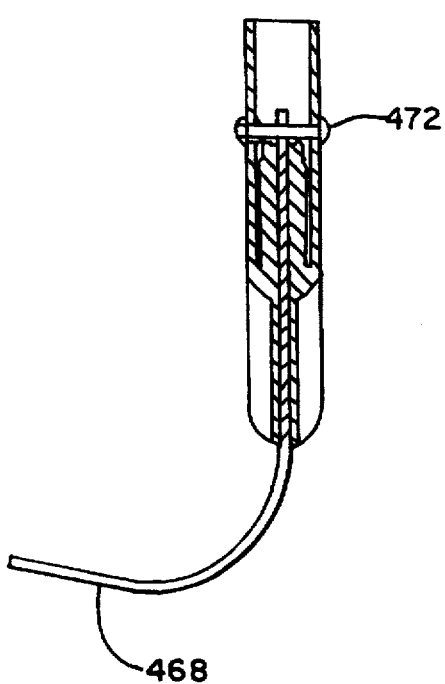
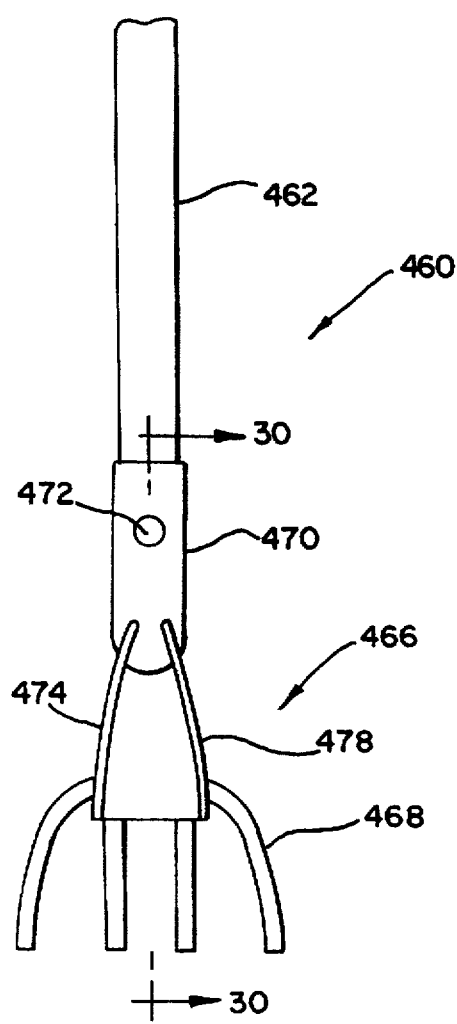
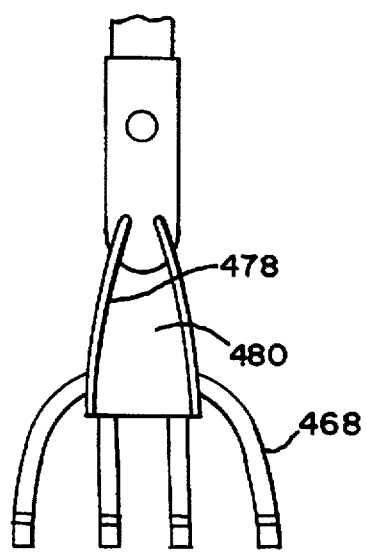

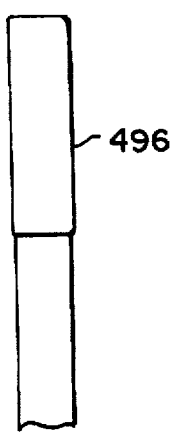
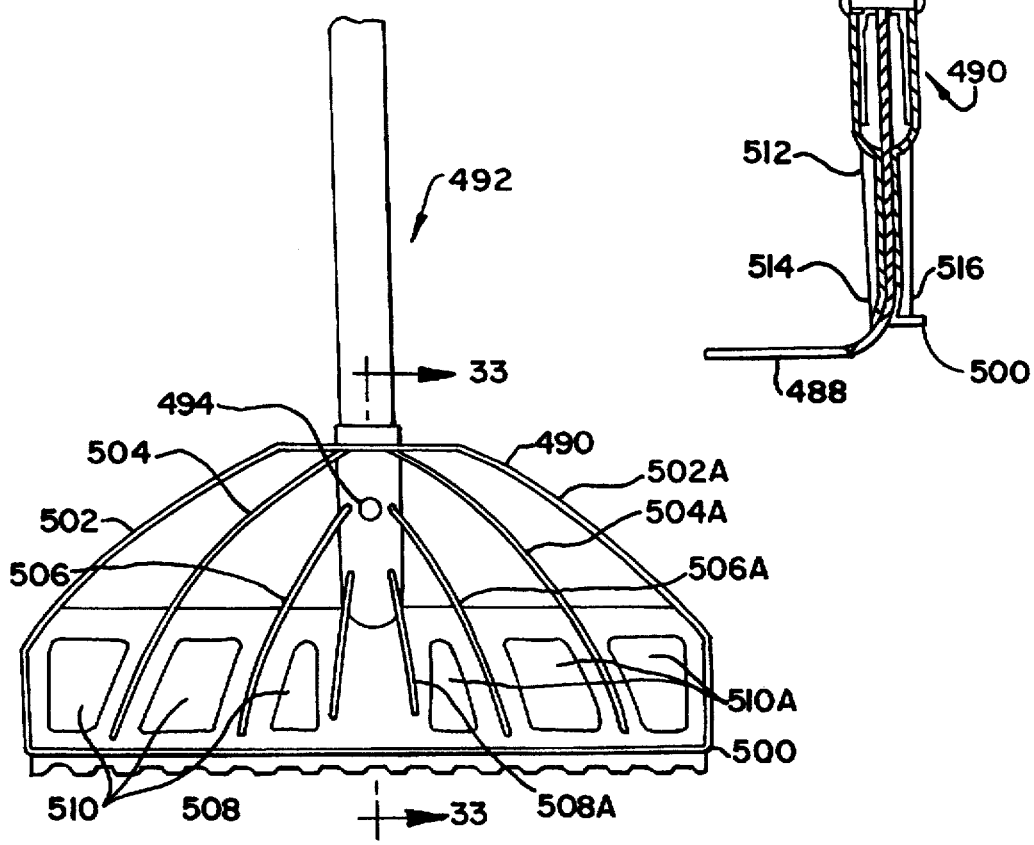
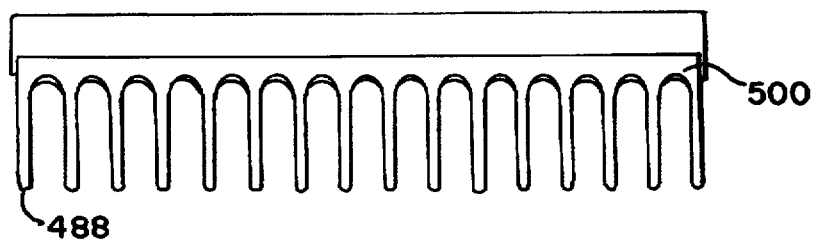

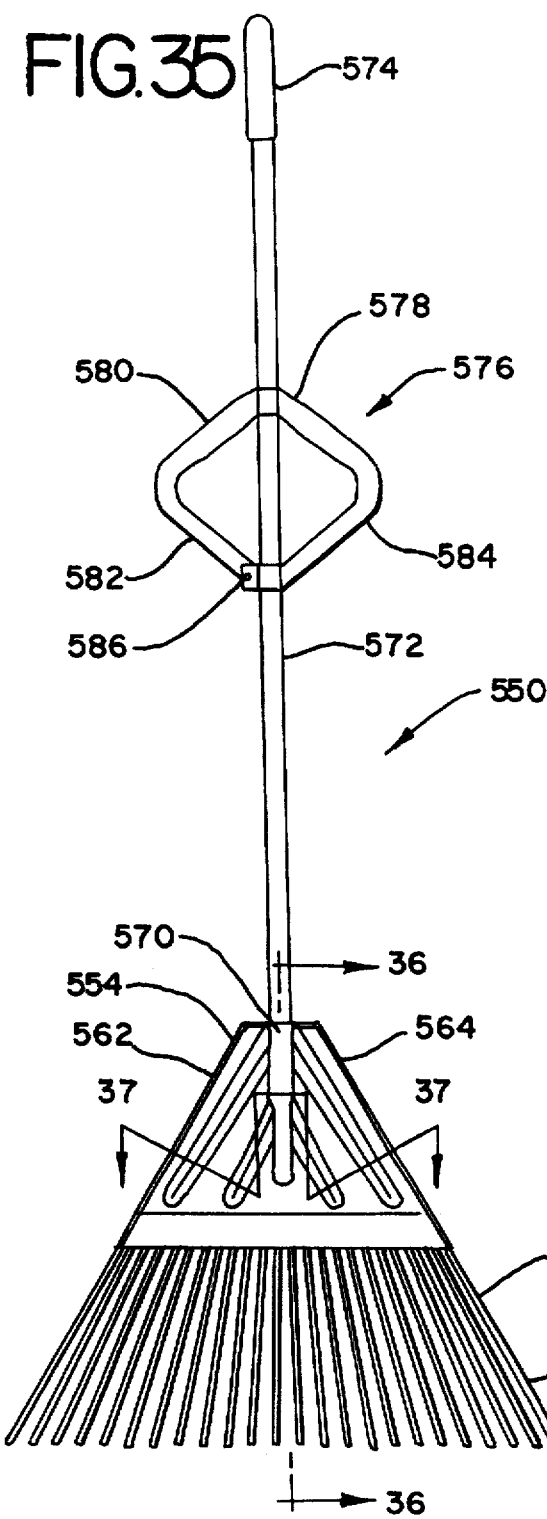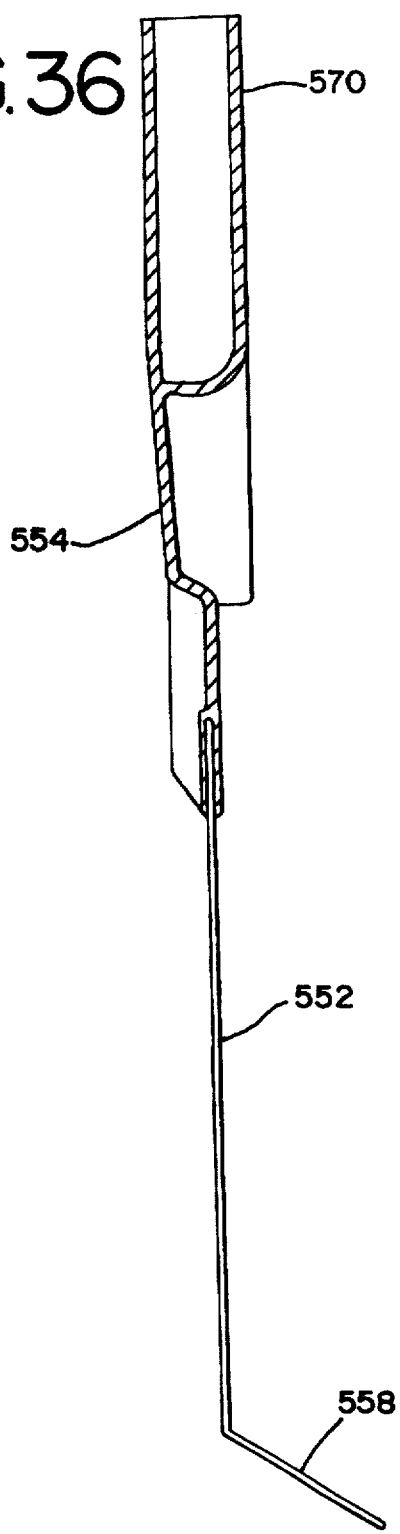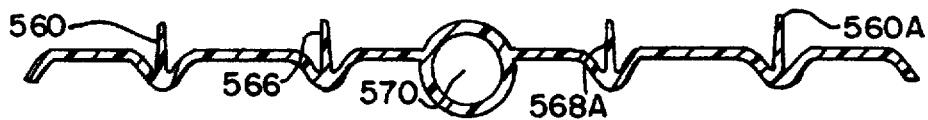

ICE CHIPPER

FIELD OF THE INVENTION

This invention relates generally to hand tools and, more particularly, to and ice scrapers used for removal of snow and ice.

BACKGROUND OF THE INVENTION

The shovel and ice scraper are well known hand tool used primarily for removing snow and ice and transferring of loose objects from one location to another. Despite the use, a primary concern with shovel design is the strength to weight ratio. Typically the stronger a shovel or ice scraper, the heavier it is, due to the amount of material mass required for rigidity. For instance, the blade of a shovel made from steel is suitable for transferring of heavy material. However, the weight of steel becomes critical if the blade is to be lifted, especially if the person lifting the blade is not trained in proper lifting techniques. If the blade is made too thin, it will bend under load. Thus, a shovel or ice scraper constructed from steel is typically of a thickness to make the weight noticeable creating a hand tool that is hefty to operate.

Further, since a shovel blade or ice scraper blade is used to move material, it is constantly subjected to abrasion which will quickly deteriorate even high quality finishes. This leads to premature failure of the tool especially in areas of the country where the tool is used for snow removal. The combination of moisture and possible road salt can quickly rust steel tools.

A shovel used primarily for snow removal is unique in that the consumer seeks as large of blade as possible yet demands minimal weight. For this reason, in place of a steel blade, manufacturers now provide alternative materials such as aluminum and plastic. It is noted that while aluminum does not rust, it is much weaker than steel and requires either sufficient thickness or steel reinforcement in order to withstand the strain. Without reinforcement of an aluminum blade to prevent counter-flexing, such as stepping on the back of the blade, the aluminum blade can easily bend in half thereby ruining the tool.

Another problem with the shovels and ice scrapers of the prior art is that the shaft and associated handle further add to the weight of the tool leaving manufacturers to try to remedy the situation with various types of materials. In this instance, steel is most suitable when used as tubing but is not used due to weight for the shaft and handle due to the inability to compensate for the retainment of the surrounding ambient temperature when used during frigid months. Further, since a steel shaft and handle must be painted, the operator can easily wear off the coating since both must be grasped in an abrasive manner quickly leading to rust abrasion.

Common practice is to make the shaft from wood and to rivet a section of wood to the handle. However, a problem with wood is that unless properly treated, water can rot the wood especially where the components are coupled together. While it is possible to replace the wood, it is more likely that the tool will be disposed of.

The blade, shaft and handle of a shovel can also be constructed from plastic which does not rot, rust, or retain cold as its wood and steel counterparts. However, the problem with plastic is strength. A plastic shaft may flex causing the shaft to bend since the shaft becomes a fulcrum point during use. A blade made of plastic further presents a number of problems including control of flexing and wear.

U.S. Pat. No. 4,280,727 discloses a one piece plastic injected molded snow shovel in which the blade, shaft and handle are molded in a single operation. The disclosure illustrates the conventional wisdom of plastic when used for a snow shovel. In particular, blade flex is controlled by use of parallel spaced apart ribs in a similar manner as used with aluminum construction. However, plastic does not flex like metal; thus, the thickness of the plastic must be increased to provide sufficient strength. The shaft of the shovel also demonstrates the complications when a shaft is formed entirely from plastic by claiming a complicated cross pattern that is expensive to manufacture.

Thus, what is needed in the art is a light weight shovel and ice scraper providing superior performance and a shaft having the rigidity of steel yet the superior properties of plastic.

SUMMARY OF THE INVENTION

The present invention satisfies this need through provision of a light weight ice scraper comprising an improved ice chipper. A shovel assembly having a graphite impregnated plastic blade reinforced with concavely outwardly extending ribs with a base thickness compensated by substantially perpendicular tabs formed in integral to the back surface of the ribs can also be provided. A shaft made from low cost steel covered with a knurled plastic sleeve provides superior rigidity with low cost manufacturing.

As disclosed within the detailed description of the preferred embodiment, the shovel of the instant invention includes a blade constructed of a thin piece of molded plastic impregnated with graphite. The graphite forms a slick surface which is reinforced by the outwardly extending ribs and centrally disposed reinforcement tabs located along the rear surface of the ribs. A stainless steel metal skid is riveted to the leading edge of the blade to prevent premature wear of the plastic.

The shaft of the ice chipper and shovel is constructed from a low cost metal tube which is suitable for acceptance of a polyethylene plastic sleeve which slides over the metal tube. Heating of the plastic causes the sleeve to shrink conforming it to the tube forming a unitary shaft which prevents slippage. In this manner a low cost unfinished steel tube facilitates adhesion of the plastic. The result is a shaft having high strength with the advantages of plastic, namely, insulation from cold steel surfaces and elimination of rusting surfaces. A handle made from molded plastic is coupled to the end of the shaft providing a shovel that can be used in a conventional manner.

Thus, an objective of the instant invention is to provide a shovel blade using outwardly curved ribs with reinforcing tabs to eliminate flexing of the blade yet allow for a blade of thin thus lightweight construction for slicing through snow.

Still another objective of the instant invention is to disclose the use of a low cost, high strength shaft constructed from a steel tubing covered by a heat shrinkable plastic sleeve providing the rigidity capable only with a steel handle yet retaining the benefits of plastic.

Yet still another objective of the instant invention is to disclose the use of graphite impregnated plastic for use with snow shovels providing a high strength blade with a slippery surface.

Other objectives and advantages of this invention will become apparent from the following description taken in conjunction with the accompanying drawings wherein are set forth by way of illustration and example, certain embodiments of this invention. The drawings constitute a part of the specification and include exemplary embodiments of the present invention and illustrate various objects and features thereof.

BRIEF DESCRIPTION OF THE DRAWINGS

FIG. 1 is a top plane view of a first embodiment of this invention illustrating a handle, shaft, and pusher snow blade;

FIG. 2 is a partial cross-sectional side view of FIG. 1 taken along lines 2—2;

FIG. 3 is a cross-sectional view of the shaft as shown in FIG. 2 and taken along lines 3—3;

FIG. 4 is a rear plane view of the blade shown in FIG. 1;

FIG. 5 is a cross-sectional view of a rib shown in FIG. 4 and taken along lines 5—5;

FIG. 6 is an exploded perspective view of FIG. 1;

FIG. 10 is a top plane view of a third embodiment of the instant invention having a plastic covered tube handle;

FIG. 11 is a cross sectional view of FIG. 10 taken along lines A—A;

FIG. 12 is a cross sectional view of FIG. 11 taken along lines B—B;

FIG. 13 is a bottom view of the shovel blade of FIG. 10;

FIG. 14 is an exploded perspective view of FIG. 10;

FIG. 15 is a top plane view of a fourth embodiment of the instant invention;

FIG. 16 is a cross sectional view of FIG. 15 taken along lines 16—16;

FIG. 17 is a cross sectional view of FIG. 16 taken along lines 17—17;

FIG. 18 is a bottom view of the shovel blade of FIG. 15;

FIG. 19 is a top plane view of a fifth embodiment of the instant invention;

FIG. 20 is a cross sectional view of FIG. 19 taken along lines 20—20;

FIG. 21 is a bottom view of the shovel blade of FIG. 19;

FIG. 22 is a top view of an ice chipper having a plastic covered tube handle;

FIG. 22A is a cross-sectional view of the ice chipper of FIG. 22 taken along lines 22A—22A of FIG. 22;

FIG. 23 is a cross sectional view of FIG. 22 taken along lines 23—23;

FIG. 24 is a bottom view of the blade of FIG. 22;

FIG. 25 is a top view of a garden hoe having a plastic covered tube handle;

FIG. 26 is a cross sectional view of FIG. 25 taken along lines 25—25;

FIG. 27 is a bottom view of the blade of FIG. 25;

FIG. 28 is an end view of the blade of FIG. 25;

FIG. 29 is a top view of a second embodiment of a garden hoe having a plastic covered tube handle;

FIG. 30 is a cross sectional view of FIG. 29 taken along lines 30—30;

FIG. 31 is a bottom view of the blade of FIG. 29;

FIG. 32 is a top view of a garden rake having a plastic covered tube handle;

FIG. 33 is a cross sectional view of FIG. 32 taken along lines 33—33;

FIG. 34 is an end view of the blade of FIG. 32;

FIG. 35 is a top view of a garden rake of a second embodiment having a plastic covered tube handle;

FIG. 36 is a cross sectional view of FIG. 35 taken along lines 36—36;

FIG. 37 is a cross sectional view of FIG. 35 taken along lines 37—37.

DETAILED DESCRIPTION OF THE PREFERRED EMBODIMENT

Figure 7:
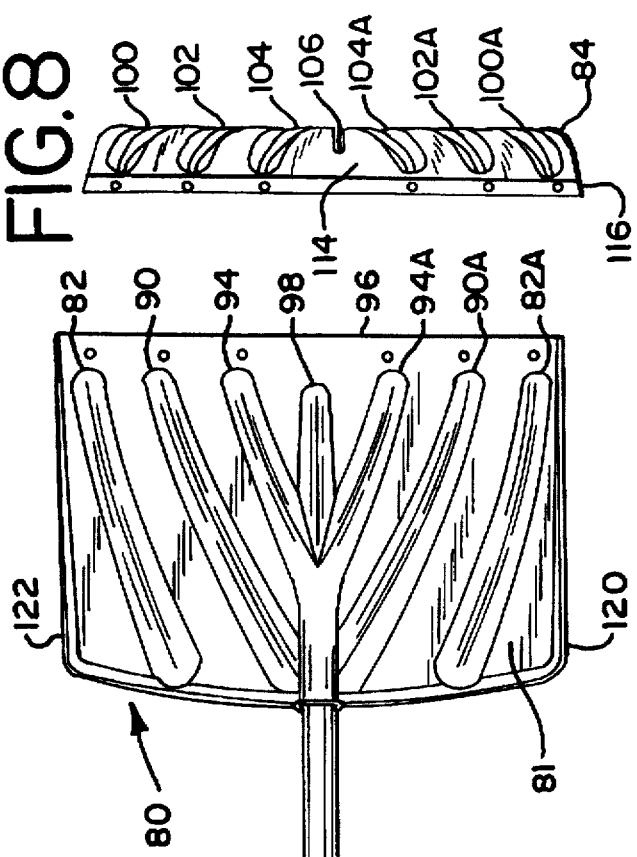
FIG. 7 is a top plane view of a second embodiment of this invention illustrating a handle, shaft, and flat snow blade.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Referring to FIG. 1, a front view of a pusher type snow shovel 10 is provided as a first embodiment of this invention generally defined by a rectangular pusher blade 12 coupled to shaft 16 and handle 18. The blade 12 is constructed of graphite impregnated polyethylene and has a unique shape that provides high strength with minimum thickness. The blade is defined by the use of outer ribs 20 and 20A which wrap around end 64 and are directed from a position inward to the shaft 16 and extend outward to the side edges 24 and 25 of the blade terminating before end edge 28. It should be noted that the blade depicted in FIG. 1, further shown in FIG. 2, forms a large curvature which the ribs follow. The ribs on either side of the center of the shovel blade, as defined by the location of shaft 16 placed between lateral sides 24 and 25, form a mirror image of the other side.

Outwardly curved reinforcement ribs provide support to the blade in both a lateral and horizontal position. The ribs project upwardly from front surface 74 and are defined as having at least two outboard disposed laterally spaced reinforced ribs 20, 20A formed concavely upward in the upper surface 74 of the blade extending outwardly between the upper edge 64 and the lower edge 28 gradually increasing in depth from a minimum depth adjacent the upper edge and the lower edge to about one inch depth; inboard disposed laterally spaced reinforced ribs 32 and 32A formed concavely upward in the upper surface 74 of the blade extending outwardly between the center of the blade to the lower edge 28 gradually increasing in depth from a minimum depth adjacent the upper edge 64 and the lower edge 28 to about one inch depth; and a center reinforced rib 42 formed concavely upward in the upper surface 74 of the blade and extending outwardly from the center of the blade to the lower edge 28 gradually increasing in depth from a minimum depth adjacent the lower edge 28 to a depth of about one inch forming an end of the coupling joint 62 for the shaft 16.

The shank 16 is shown coupled to the blade having two knurled surfaces 52 and 54 providing the operator with a handgrip location so as to help prevent a loosely gripped shank from sliding out of the operator's grasp. The handle 18 is molded from a single piece of plastic and includes a handgrip which is fixed to the shaft 16 by means of at least one screw 56.

Now referring to FIG. 2 a cross-sectional side view of the pusher shovel illustrates the use of reinforcement tabs 30 and 36 which are operatively associated with the ribs 20 and 32 respectively. FIG. 2 is taken along lines 2—2 as shown in FIG. 1. The ribs extend outward from the shell 60 of the blade approximately one-inch along shaft coupler, 62 and taper into the base 60 along the leading edge 28 and upper edge 64. By use of reinforcing ribs, as further defined in this specification, the thickness of the base 60 can be reduced accordingly. Tab 36 which is found within rib 32 is enlarged and actually molds into the shaft coupling 62 while tapering to a point of being flush with the base 60 near leading edge 28 as well as upper edge 64. The enhanced curvature 60 of the pusher shovel allows snow to roll within the front surface 74 of the shovel formed into a cavity keeping snow within the confines of the shovel blade and side edges 24 and 25. The curve allows for a maximum throw of snow while used in its design mode of pushing the snow. The blade has graphite impregnated material making the surface of the shovel slippery which helps avoid snow from sticking to the surface.

A stainless steel wear strip 50 is secured to the edge 28 of the shell 60 by use of rivets 52 to prevent premature wear normally associated with polyethylene shovel blades. The edge 28 is slightly enlarged so that the wear strip 50 will encompass the edge to prevent disengagement. The shaft 16 is coupled to the blade at coupling adapter 62 by self tapping stainless steel screws 68.

A cross-sectional end view of the shaft 16 is provided in FIG. 3 as taken across lines 3—3 of FIG. 2. The shaft 16 consists of metal pipe 70 preferably made of galvanized steel tubing which is encompassed by a plastic polyethylene sleeve 72 which is installed over the pipe 70 and subjected to heat causing the plastic tube 72 to shrink and conform to the pipe 70.

Now referring to FIG. 4, the rear of the shovel is shown illustrating reinforcement of the ribs illustrated in FIG. 1. Reinforcement tabs 30 and 30A extend along the center of ribs and project outwardly along the backside of the blade 76 anywhere from a quarter of an inch to one inch in height. The use of the tab is repeated in the ribs providing structural integrity to the blade by duplicating a blade having a thickness corresponding to the tab without the need of having the entire blade made of that thickness. Ribs 32 and 32A project from the base of the shaft attachment 62 and project outwardly to the leading edge 28 of the blade curving towards each side edge 24 and 25 respectively. The centrally placed ribs provide reinforcement to the edge of the blade in those instances where the shaft is forced into the blade due when striking a non-moving object. As previously mentioned the ribs 20 and 32 include reinforcement tabs 30 and 36 respectively which are formed integral to the rib and project outwardly so as to provide structural integrity in the lateral plane so as to eliminate flexing of the blade. Similarly ribs 40 and 40A have tabs 41 and 41A respectively propagating from the middle of the shovel blade to the leading edge 28. Cross tab 37 interconnects the enlarged portion of the tabs along curvature of the blade. Tabs 39 provide particular reinforcement to tabs 36 and 36A for position reinforcement when pushed against rigid material. The metal reinforcement strip 50 is shown secured to the front edge 28 of the blade providing a wear resistant edge for use on pavement. FIG. 5 illustrates a cross-sectional view of rib 20 wherein the front surface 74 of the blade material 60 is raised from a flat plane anywhere from a quarter of an inch to ½ inches in height. The rear surface 76 illustrates tab 30 centrally disposed within the concave portion of the rib 20 along the back surface 76. The tab 30 is angularly formed toward the center of the shovel providing rigidity to the blade and eliminating flex under heavy load. The tabs allow the use of a thinner sidewall thickness yet further prevent the blade from folding or collapsing under adverse conditions.

FIG. 6 illustrates the pusher type blade 12 in an exploded perspective view. The blade 12 inner surface 74 defines a partial bucket having sidewalls 24, 25, leading edge 28, and upper edge 64. The upper surface of the blade illustrates the ribs 20, 32, 40, and mirror image counterparts and center rib 42. Along the upper edge 64 is a semi-circular opening 78 which facilitates storage and shipping of the device when placed in an upright position wherein the opening 78 will accommodate the shaft of a similarly shaped shovel allowing the blades to nest thereby providing a type of inter-lock for shipping or display. The handle 16 is illustrated with plastic sleeve 72 placed over the majority of the steel pipe 70. The pipe 70 is the same length as the sleeve 72. Mounting screws 68 are available for attaching the shaft 16 to the blade 12. Similarly handle 18 is shown in position for attachment to the other end of the shaft 16 with screws 56 available for securing to the shaft.

Figure 8:
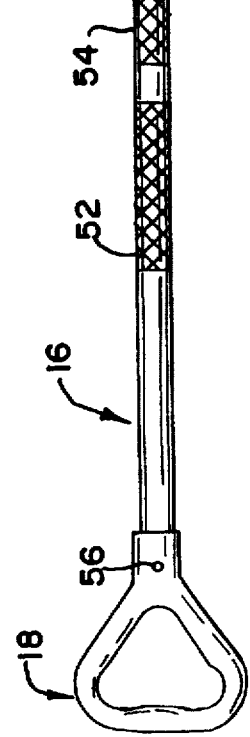
FIG. 8 is an end view of FIG. 7.

FIG. 7 sets forth an alternative embodiment of the instant invention by disclosing a flat blade snow shovel 80. In a similar fashion to the aforementioned pusher blade shovel, the instant invention utilizes the shaft 16 with the polyethylene sleeve 72 and knurled handle grip surfaces 52, 54. The handle 18 is similarly attached to the shaft 16 by attachment screw 56. In this embodiment, blade 80 is substantially flat having front surface 81, outer ribs 82, 82A and inner ribs 90, 90A. Partial ribs 94 and 94A and straight rib 98 provide frontal edge 96 support in the same manner as the previously described pusher blade. The end view, FIG. 8, illustrates the reinforcement tabs along the bottom surface 84 of the blade. Thus, tabs 100 and 100A are formed integral to ribs 82 and 82A; tabs 102 and 102A are formed integral to ribs 90 and 90A; and tabs 104 and 104A formed integral to ribs 94 and 94A respectively. Center support rib 98 has tab 106 molded thereto. As with the pusher blade, a stainless steel skid 116 is coupled to the blade to prevent premature wear.

Figure 9:
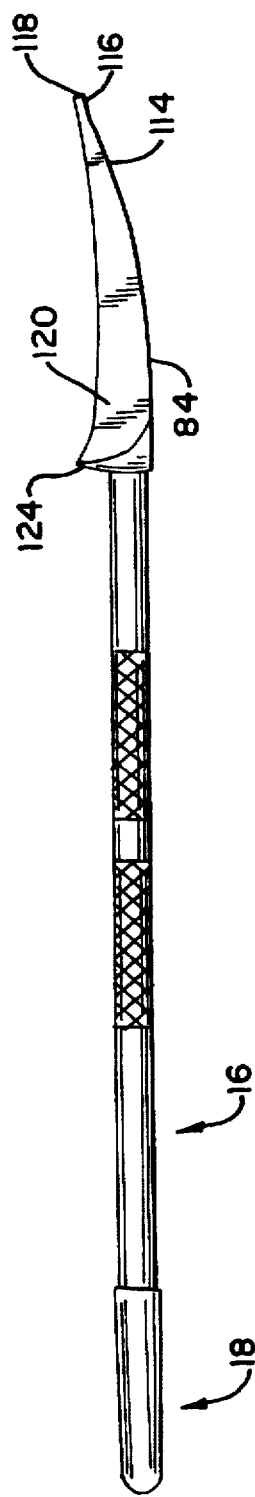
FIG. 9 is a side view of FIG. 7.

Now referring to FIG. 9 a side view of the straight blade shovel illustrates the blade 80 having a substantially flat bottom 84 with sloped surface portion 114 leading to the stainless steel protector 116 placed along the leading edge 118 of the blade. The blade 80 has side edges 120 and 122 and rear lip 124 to help maintain snow within the scoop during transfer.

Referring to FIG. 10, a front view of a partial pusher type snow shovel 150 is provided as an alternative embodiment to this invention and is generally defined by a rectangular pusher blade 152 coupled to shaft 154 and handle 156. The blade 152 is constructed of graphite impregnated plastic and has a unique shape that provides for high strength with minimal thickness. The blade 152 is further defined by the use of outer ribs 158 and 158A which wrap around end 160 and are directed from a position inward to the shaft 154 and extend outward to side edges 162 and 164 terminating before end edge 166.

The ribs on either side of the center of the shovel blade, as defined by the location of the shaft placed between lateral sides 162 and 164, form a mirror image of the other side. Outwardly curved reinforcement ribs provide support to the blade in both a lateral and horizontal position. The ribs project upwardly from frontal surface 168 and are defined as having at least two outboard disposed laterally spaced reinforced ribs 158 and 158A formed concavely upward in the upper surface 168 of the blade extending outwardly between the upper edge 160 and the lower edge 166 gradually increasing in depth from a minimum depth adjacent the upper edge and the lower edge to about one inch depth; inboard disposed laterally spaced reinforced ribs 170 and 170A are formed concavely upward in the upper surface 168 of the blade extending outwardly between the center of the blade to the lower edge 166 gradually increasing in depth from a minimum depth adjacent the upper edge 160 and the lower edge 166 to about one inch depth; and a center reinforced rib 172 formed concavely upward in the upper surface 168 of the blade and extending outwardly from the center of the blade to the lower edge 166 gradually increasing in depth from a minimum depth adjacent the lower edge 166 to a depth of about one inch forming an end of the coupling joint 174 for the shaft.

The shank 154 is a plastic outer sleeve with a knurled surface 176 providing the operator with a handgrip location so as to help prevent a loosely gripped shaft from sliding out of the operator's grasp. The handle 156 is molded from a single piece of plastic and includes a handgrip which is fixed to the shaft 154 by means of at least one screw 178.

Now referring to FIG. 11 set forth is a cross-sectional side view of the modified pusher shovel which illustrates the use of reinforcement tab 180 which is operatively associated with ribs 158. FIG. 11 is taken along lines A—A as shown in FIG. 10. The ribs extend outward from the shell 182 of the blade approximately one-inch along shaft coupler 174 and taper into the shell 182 near leading edge 166 and upper edge 160. By use of reinforcing ribs, as further defined in this specification, the thickness of the shell 182 can be reduced accordingly. The curve allows for a maximum throw of snow while used in its design mode of pushing snow, the graphite impregnated plastic making the surface of the shovel slippery which helps avoid snow from sticking to the surface.

A stainless steel wear strip 184 may be secured along the edge 166 of the shell 182 by use of rivets to prevent premature wear normally associated with plastic shovel blades. The edge 166 includes an enlarged lower lip which fits within the stainless steel wear strip 184 to help prevent disengagement. The shaft 154 is coupled to the blade 152 at coupling adapter 174 by self tapping steel screws 185.

A cross-sectional end view of the shaft 154 is provided in FIG. 12 as taken across lines B—B of FIG. 11. The shaft 154 consists of a metal pipe 186 preferably constructed of galvanized steel tubing which is encompassed by a plastic polyethylene sleeve 188 which is installed over the tube 186 and subjected to heat causing the plastic sleeve to shrink and conform to the tube 186.

Now referring to FIG. 13, the rear of the shovel is shown illustrating reinforcement of the ribs. Reinforcement tabs 180 and 180A extend along the center of ribs 158 and 158A and project outwardly from the back side surface 190 of the blade. The use of the tab is repeated in the ribs providing structural integrity to the blade by duplicating a blade having a thickness corresponding to the tab without the need of having the entire blade made of that thickness. Ribs 192 and 192A project from the base of shaft attachment 174 and project outwardly to the leading edge 166 of the blade. Tabs 194, 194A provide support for center rib 172 and are adjoined by support ribs 196 leading to a forward section of shaft attachment 174. Though not shown in this drawing but described in previous embodiments, lower section 198 juxtapositioned to leading edge 166 provides a reinforced area for placement of a stainless steel wear blade, not shown, which can be attached by rivets.

FIG. 14 illustrates the pusher type blade 152 in an exploded perspective view. The blade 152 inner surface 200 defines a partial bucket having sidewalls 202 and 204 with leading edge 166 and upper edge 182. The upper surface 200 of the blade illustrates the ribs 158, 170, and 172 with mirror image counterparts. Along the upper edge 182 is a semi-circular opening 206 which facilitates storage and shipping of the device when placed in an upright position wherein the opening 206 will accommodate the shaft of a similarly shaped shovel allowing the blades to nest thereby providing a type of inter-lock for shipping or display. The handle 156 is illustrated with plastic sleeve 188 placed over the majority of the steel tube 186. Mounting screws 185 are available for attaching the shaft 150 to the blade 152. Similarly, handle 156 is shown in position for attachment to the other end of the shaft 150 with screws 210 available for securing the handle to the shaft.

Now referring to FIG. 15, set forth is yet another embodiment of the instant invention. This embodiment includes a blade 250 having an enlarged edge 252 as provided by corner 254 and 256. Corner 254 leads to edge 258 curved inwardly along a central access of the blade before moving into an outward position as depicted by upper corner 260. Similarly, corner 256 leads to side edge 262 which is curved inwardly toward a central access of the blade 250 before curving outwardly to upper edge 264. An upper edge 266 of the blade includes outwardly extending wings 268 and 270 which provide support for handle shaft coupling 272 along a horizontal plane with wings 274 and 278 providing support along a vertical plane on each side of said shaft coupling 272. It is noted that the shaft coupling 272 is mounted external of the blade wherein previous embodiments allow the insertion of the handle into an aperture for a coupling hole integrated into the body of the blade. In this embodiment the external placement of the shaft coupling 272 provides a blade surface 280 of a substantially uniform depth.

In a similar format to the previous embodiments, raised ridges are provided within the surface of the blade so as to provide a structurally ridged blade with minimal plastic material. As with the previous embodiments, the plurality of raised ribs are placed across the surface 280 of the blade 250. In particular, outer support ribs 282 and 282A are raised from the surface 280 of the blade a pre-defined distance having an upper portion curved inwardly toward the center access of the blade where it impacts to the ribs which are directed toward the shaft coupling 272. Similarly, secondary ribs 284 and 284A provide a similar function with an upper portion leading toward the handle coupler. A centrally disposed rib portion 286 includes side ribs 288 and 288A all leading to an upper portion formed along a central access of the blade. As previously noted, in this embodiment shaft coupling 272 is not integrated into the blade allowing the aforementioned ribs to maintain a low profile. In this embodiment handle 290 includes a gripping surface consisting of a plurality of ridges having indentations set at 10° angles along the longitudinal length of the handle and axis of the blade. Handle 292 is coupled to the shaft 290. Handle 292 is coupled to an end of shaft 290 providing ease of operation of the blade. The shaft 290 is coupled to the handle and the blade by use of mounting screws.

As shown in FIG. 16, the blade 250 includes a near parallel axis with shaft coupling 272 and lower edge 252. Side wall 258 follows along the contour of the shovel before entering a sharp radius leading to upper portion 260 set forth at a parallel plane to coupling 272. Wear blade 294 is secured along a bottom edge of the blade to prevent wear in preventing the destruction of edge 252.

As shown in FIG. 17, the shaft 290 includes a center tube 296 and outer sleeve 298 constructed of plastic having longitudinal indentations separated by approximately 10° radius allowing an individual's hand to slide up and down the sleeve yet prevent slidable movement of the hand around an axis of the shaft. The profile of the sleeve includes a radius of approximately 0.075 inches formed between each indentation providing sufficient friction through the indentations for grasping of the handle yet a smooth surface allowing gripping of the cover without a glove or the like hand protector providing a smooth surface to the touch.

FIG. 18 sets forth a bottom view of the blade 250 illustrating shaft coupling 272 supported by wing 270 on one side and wing 268 on the opposite side. Tab 302 which reinforces the bottom surface of rib 284 has an upper portion 304 molded into and formed as part of wing 270. This tab transfers stress exerted onto the inner surface of the shovel to the tab back to the wing to prevent deformation of the blade. Similarly, excess stress placed on the shaft which is inserted into shaft coupling 272 is transferred along the tab to the base of the blade. Similarly, tab 306 which is formed along the bottom surface of rib 284A has upper portion 308 for the purposes of relieving stress. Tabs 310 and 312 are formed along the bottom surface of the outside ribs with a center tab 314 formed along the axis of the blade with tabs 316 and 318 adjoining the center tab providing reinforcement to each lower surface of the adjoining rib.

Now referring to FIG. 19, set forth is a scoop shovel 350 having an elongated blade section 352 with a leading edge 354 and shaft coupling end 356. The blade includes a first and second outer position rib 358 and 360 placed on either side of a centrally disposed rib 362 having first and second legs 365 and 366. Scoop shovel 350 is constructed of plastic having a shaft 364 using a metal tube surrounded by a plastic sleeve. Handle 367 is also constructed of plastic and coupled to the shaft in the same manner as previously described in the alternative embodiments.

Referring to FIG. 20, a side view of the blade 352 is depicted having a base 368 which is substantially flat with a leading edge 354 protected by stainless steel wear guard 370 which is coupled to the edge by use of rivets 372. The blade 352 includes raised side walls 374 and 378 providing a scoop area for lifting of materials. The shaft coupler 356 is integrated into the blade 352 having an upper wall of the shaft coupler disposed parallel to an upper surface of the center rib 362 providing support to the blade during heavy load conditions.

FIG. 21 sets forth a back view of the blade with bottom surface 368 showing the inverse of ribs described in FIG. 19. In light of the elongated length of the blade, tabs are not required placement within the ribs for purposes of reinforcement. However, the shaft coupler 356 is directly integrated into a center rib 362 traversing both side surfaces 352 and 368 of the blade 352. Stainless steel wear bar 370 is shown on the bottom surface 368 of the blade to protect the edge 354 from premature material loss.

Referring in general to FIGS. 22–24, set forth is an embodiment of an ice scraper 380 utilizing the tube with plastic sleeve shaft. The ice scraper 380 consists of a blade holder 382 and shaft 384. The blade holder 382 further includes a replaceable cutting blade 386 formed from either plastic or metal having a leading edge 388 which is chamfered to the cutting blade 386 which is of nominal thickness and supported by blade support section 390 which sandwiches each side surface of the cutting blade 386. Blade holder 382 comprises a blade support section 390 an upper edge having a plurality of ridges 392 forming a non-slip surface allowing an individual to push on the upper end of the blade holder with their foot to loosen stubborn ice chunks. Blade support section 390 includes a plurality of reinforcement ridges 394 comprising curved reinforcement ribs. The ridges 394 provide support to the cutting edge by having outwardly extending shapes from a center axis formed along the length of the shaft outwardly along each side surface (lateral edge) 396 and 398 of the ice scraper. The front (upper) surface 400 of the blade support and blade holder forms a mirror image of the back (bottom) surface 402 of the blade. Rivet 404 provides for the releasable securement of cutting blade 386. As previously described, the handle shaft 384 is constructed of a low cost center steel tube 385 (FIG. 22A) surrounded by a plastic sleeve 387 which may be knurled 405 to provide a knurled gripping surface in a similar format to the aforementioned shovels. An enlarged end 406 is provided by use of a cap so as to prevent water from entering the tube as well as allowing an enlarged grasping surface along the end of the ice scraper.

In the preferred embodiment, the ice chipper 380 comprises a blade holder 382 constructed of single piece of plastic. The blade holder 382 has an upper surface 400 and a bottom surface 402 with first and second generally parallel upright lateral edges 396 and 398 and an upper edge and a bifurcated lower edge. The blade holder has a socket providing a centrally disposed coupling joint 408 which is positioned between the lateral edges. The upper and bottom surfaces 400 and 402 of the blade holder 382 have a plurality of spaced apart reinforcement ribs 394. A steel cutting blade 386 provides a blade element of nominal thickness with an upper end that is insertable into the bifurcated lower edge of the blade holder 382. The blade 386 has a chamfered lower end 388 for chipping ice. A rivet 404 provides fastening means for securing the steel blade 386 to the bifurcated lower edge of the blade holder 382. The ice chipper 380 has a handle assembly comprising a shaft 384 constructed from a steel tube 385 positioned within and annularly surrounded by a plastic sleeve 387. The sleeve 387 is secured in fixed relationship to the shaft 384 and is of a similar length as the shaft 384. The shaft 384 is insertable into said coupling joint of said blade holder 382. A handle or handgrip providing a cap 406 has an opening formed at one end for insertion on a free end of said shaft 384. Preferably, the plastic sleeve 387 is constructed of polyethylene that conforms to said steel tube 385 upon receipt of heat. A portion of the plastic sleeve 387 can be knurled 405 to provide a gripping surface.

The spaced apart reinforcement ribs 394 of the blade holder 382 can comprise eight stress relief ribs positioned on each surface of the blade holder 382. The ribs 394 can be formed from narrow strips of plastic having a uniform height. Each of the ribs 394 can have a longitudinal length with lower first end spaced above and juxtapositioned near the lower edge of the blade holder 382. The ribs 394 can be directed inwardly toward a center axis of the blade holder 382.

Referring now to FIGS. 25–28 set forth is a garden hoe incorporating a metal tube with plastic sleeve. A garden hoe 420 has a shaft 422 constructed of a steel tube with plastic sleeve having an end cap 424 which covers the open end of the tube and provides a smooth surface which is slightly enlarged for grasping. The shaft 422 is inserted into a shaft coupler 426 having a blade 428 secured to the coupler by rivet 430. The blade 428 is formed at a perpendicular angle to the shaft 422 and supported by a blade support which sandwiches an upper portion of the blade 428 so as to prevent excessive movement of the blade section. Blade portion 432 includes a first and second rib 434 and 436 which bear on a first side surface of the upper portion of said blade 428 and lower ribs 438 and 440 on the backside of the support to prevent excessive movement of the blade 428 at a leading edge 442 with a first and second side wall 444, 446 leading to the upper support section 448 forming a nick of nominal thickness which is inserted into the shaft coupler and secured thereto by use of rivet 430.

Now referring to FIGS. 29–31, set forth is a cultivator based upon the same principles as the previously described ice scraper and garden hoe. The cultivator 460 consists of a shaft 462 having a metal tube base encompassed by a plastic sleeve. A handle 464 in the form of an enlarged end tube is positioned over the end of the shaft. Shaft 462 attaches to a cultivator base 466 having four individual prongs 468 which are secured to shaft coupler 470 by use of rivet 472. The shaft coupler 470 includes an inner and outer support body portion sandwiching an upper end of the cultivator prongs by use of a first and second outwardly extending rib 474 and 476 on one side with ribs forming a mirror image to the front mounted ribs numerated 478 and 480.

Referring in general to FIGS. 32–34, set forth is a garden rake further having a basic assembly method as the aforementioned ice scraper, cultivator, and garden hoe by use of an inserted molder head assembly 490 fastened to a steel tube having a plastic sleeve forming shaft 492 by use of rivet 494. Shaft 492 includes end cap 496 providing ease for grasping and protection from the sharp end formed by the end of the metal tube. The molded head assembly 490 has a plurality of teeth 488 formed along a leading edge 500 of the head with reinforcement to the teeth provided by ribs 502, 502A, 504, 504A, 506, 506A, 508, and 508A. The ribs provide reinforcement to the teeth and prevent the molded head from flexing allowing material removal through apertures 510, 510A lessening the weight of the garden rake. A lower side surface 512 of the head 490 has a round lip 514 following the curvature of the teeth 488 providing support should the teeth 488 be forced into a rearward position. An upper portion 516 of the head 490 illustrates support edge 500 leading to reinforcement ribs which prevent unwanted flexing of the teeth to any position substantially out of the axis plane of the shaft 492.

Now referring to FIGS. 35–37, shown is a leaf rake 550 which includes a one-piece spring steel sheet 552 which is insert molded to form a portion of the rake head 554. Holes, not shown, within the steel allow plastic to adhere to the metal with the sheet split into individual prongs 556 having a lower end 558 which is bent into an angle which allows the rake to be used in its ordinary and conventional manner. The sheet 552 is further supported on each side surface by the plastic head which is reinforced by the use of ribs 560, 560A along an outer side edge 562 and 564 of the rake head with inner ribs 566 and 566A formed along an inner portion of the rake head leading to shaft coupler 570. Shaft 572 is a steel tube having a plastic sleeve as with the previous embodiments including an end cap 574 placed over the end of the shaft allowing for increased grasping area as well as preventing injury from an unfinished tubular end. A mid handle 576 forms a diamond shape with upper portions 578, 580 formed at an angular position to the shank 572 and with lower portions 582 and 584 returning the mid handle to the shank with attachment bolt 586 securing the mid handle in a fixed position. The angular position has been found to reduce or eliminate carpal tunnel syndrome by allowing the wrist to be positioned in a normal position parallel to the plane of the human arm providing an alternative handle for comfortable positioning.

It is to be understood that while we have described certain forms of our invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. An ice chipper comprising: a blade holder constructed of a single piece of plastic defined by an upper surface and a bottom surface with first and second generally parallel lateral edges and an upper edge and a bifurcated lower edge, said holder having a centrally disposed coupling joint positioned between said lateral edges with each said surface having a plurality of spaced apart reinforcement ribs; a steel blade having an upper end insertable into said bifurcated lower edge and a chamfered lower end for chipping ice; means for securing said steel blade in said bifurcated lower edge; a shaft constructed from a steel tube with a plastic sleeve, said shaft insertable into said coupling joint of said blade holder; and a handle having an opening formed at one end for insertion on a free end of said shaft.

2. The ice chipper according to claim 1 wherein said plastic sleeve is constructed of polyethylene that conforms to said steel tube upon receipt of heat.

3. The ice chipper according to claim 2 wherein a portion of said plastic sleeve is knurled to provide a gripping surface.

4. The ice chipper according to claim 1 wherein said spaced apart reinforcement ribs are further defined as eight stress relief ribs positioned on each surface of the blade holder and formed from narrow strips of plastic having a uniform height and each having a longitudinal length having a first end juxtapositioned to said lower edge and directed inwardly toward a center axis of the blade holder.

5. An ice chipper, comprising:
    a handle assembly having a shaft comprising a metal tube and a plastic sleeve annularly surrounding and secured in fixed relationship to said metal tube, said metal tube being completely positioned within said sleeve; and
    a blade assembly comprising an ice-chipping blade and a plastic blade holder having a bifurcated lower edge for receiving said ice-chipping blade, and said plastic blade holder having reinforcement ribs and being operatively connected to said handle assembly.

6. An ice chipper in accordance with claim 5 wherein said metal tube comprise a steel tube.

7. An ice chipper in accordance with claim 5 wherein said sleeve comprises a polyethylene sleeve.

8. An ice chipper in accordance with claim 5 wherein said blade assembly includes a blade holder for holding said blade.

9. An ice chipper in accordance with claim 8 wherein said blade holder comprises a plastic blade-support section.

10. An ice chipper in accordance with claim 8 wherein said plastic blade holder includes a coupling providing a socket for receiving said handle assembly and a fastener for securing said handle assembly to said coupling.

11. An ice chipper in accordance with claim 5 wherein said ribs comprise curved ribs.

12. An ice chipper in accordance with claim 5 wherein said ribs comprise outwardly diverging ribs.

13. An ice chipper in accordance with claim 5 wherein said blade holder has an upper end with a substantially non-slip surface for receiving and being pushed by a foot of a person using the ice chipper.

14. An ice chipper in accordance with claim 13 wherein said non-slip surface comprises ridges.

15. An ice chipper in accordance with claim 14 wherein said blade has a cutting edge and said ridges extend upwardly and away from said cutting edge of said blade.

16. An ice chipper in accordance with claim 5 wherein said handle assembly has an upper end with a cap for sealing said metal tube.

17. An ice chipper in accordance with claim 5 wherein:

said blade is selected from the group consisting of a metal blade, a steel blade, and a plastic blade; and said blade has a lower end with a chamfered edge for chipping ice.

18. An ice chipper comprising: a blade holder constructed of plastic defined by an upper surface and a bottom surface with first and second lateral edges and an upper edge and bifurcated lower edges, said blade holder having a centrally disposed coupling joint positioned between said lateral edges with each said surface having a plurality of spaced apart reinforcement ribs; a blade element having an upper end insertable into said bifurcated lower edges and a chamfered lower end for chipping ice; a fastener for securing said blade element in said bifurcated lower edges; a shaft constructed from a metal tube completely positioned within a plastic sleeve, said shaft insertable into said coupling joint of said blade holder; and a handle having an opening formed at one end for insertion on a free end of said shaft.

19. The ice chipper according to claim 18 wherein said plastic sleeve is constructed of polyethylene, said metal tube is constructed of steel, and said sleeve conforms to said steel tube upon receipt of heat.

20. The ice chipper according to claim 18 wherein a portion of said plastic sleeve comprises a gripping surface.

21. The ice chipper according to claim 18 wherein said spaced apart reinforcement ribs are further defined as stress relief ribs positioned on each surface of the blade holder and formed from plastic having a uniform height, and each of said ribs having a longitudinal length with a lower end spaced from said lower edge and directed inwardly toward a center axis of the blade holder.

* * * * *